(12) United States Patent
Wagner et al.

(10) Patent No.: US 11,537,890 B2
(45) Date of Patent: Dec. 27, 2022

(54) COMPRESSING WEIGHTS FOR DISTRIBUTED NEURAL NETWORKS

(71) Applicant: Microsoft Technology Licensing, LLC, Redmond, WA (US)

(72) Inventors: Andy Wagner, Cupertino, CA (US); Tiyasa Mitra, San Jose, CA (US); Marc Tremblay, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 293 days.

(21) Appl. No.: 17/016,143

(22) Filed: Sep. 9, 2020

(65) Prior Publication Data

US 2022/0076112 A1    Mar. 10, 2022

(51) Int. Cl.
*G06N 3/08* (2006.01)
*G06F 40/47* (2020.01)

(52) U.S. Cl.
CPC .............. *G06N 3/08* (2013.01); *G06F 40/47* (2020.01)

(58) Field of Classification Search
CPC ..... G06F 17/16; G06F 7/5443; G06N 3/0635; G06N 3/08
See application file for complete search history.

(56) References Cited

U.S. PATENT DOCUMENTS 9,646,243 B1 * 5/2017 Gokmen .................. G06N 3/08
2019/0340508 A1 * 11/2019 Liu ........................... G06N 3/08
2020/0020393 A1 * 1/2020 Al-Shamma ........... G11C 16/10
2020/0082252 A1 * 3/2020 Ge ............................ G06N 3/063
2020/0342301 A1 * 10/2020 Miao ..................... G06N 3/0454

OTHER PUBLICATIONS

Anil, et al., "Large Scale Distributed Neural Network Training through Online Distillation", In Repository of arXiv:1804.03235v2, Aug. 20, 2020, 12 Pages.
Asif, et al., "Ensemble Knowledge Distillation for Learning Improved and Efficient Networks", In Repository of arXiv:1909.08097v1, Sep. 17, 2019, 12 Pages.
Mishra, et al., "Apprentice: Using Knowledge Distillation Techniques to Improve Low-Precision Network Accuracy", In Repository of arXiv:1711.05852v1, Nov. 15, 2017, 15 Pages.
"International Search Report and Written Opinion Issued in PCT Application No. PCT/US2021/035079", dated Oct. 13, 2021, 11 Pages.

* cited by examiner

*Primary Examiner* — Pegeman Karimi
(74) *Attorney, Agent, or Firm* — Fountainhead Law Group PC

(57) ABSTRACT

Embodiments of the present disclosure include systems and methods for compressing weights for distributed neural networks. In some embodiments, a first network comprising a first set of weights is trained using a set of training data. A second network comprising a second set of weights is trained using the set of training data. A number of weights in the first set of weights is greater than a number of weights in the second set of weights. The first set of weights are adjusted based on a first loss determined by the first network and a second loss determined by the second network. The second set of weights are adjusted based on the first loss determined by the first network and the second loss determined by the second network. Values of the second set of weights are sent to a computing system.

20 Claims, 9 Drawing Sheets

COMPRESSING WEIGHTS FOR DISTRIBUTED NEURAL NETWORKS

BACKGROUND

The present disclosure relates to a computing system. More particularly, the present disclosure relates to techniques for training a neural network.

Natural-language understanding (NLU) is a subfield of natural-language processing (NLP) in artificial intelligence that addresses comprehension by computers of the structure and meaning of human language. NLU enables voice technology, search engines, and machine translation to deduce what a user means, regardless of the way it is expressed A neural network is a machine learning model that underpins NLU applications. A neural network is trained for a particular purpose by running datasets through it, comparing results from the neural network to known results, and updating the network based on the differences.

BRIEF DESCRIPTION OF THE DRAWINGS

Various embodiments of the present disclosure are illustrated by way of example and not limitation in the figures of the accompanying drawings.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Described here are techniques for compressing weights for distributed neural networks. In some embodiments, a distributed neural network system includes several neural network nodes and a weight manager. Each neural network node includes a neural network. The neural network may include weights. When training data is used to train the neural network, the values of the weights can be adjusted. Each neural network node transmits the values of the weights to the weight manager. The neural network nodes can each have a mechanism for compressing the weights of the neural network so that less bandwidth is used when the weights are transmitted to the weight manager. Once the weight manager receives weight values from all the neural network nodes, the weight manager may calculate average weight values based on the received weight values. Then, the weight manager sends these average weight values to each of the neural network nodes.

The techniques described in the present application provide a number of benefits and advantages over conventional methods of training distributed neural networks. For instance, by compressing weight values that neural network nodes share with the weight manager, the amount of bandwidth used is reduced compared to conventional methods of sharing weight values of neural networks in neural network nodes. This reduced bandwidth usage also allows quicker training of the neural networks in the neural network nodes.

Figure 1:
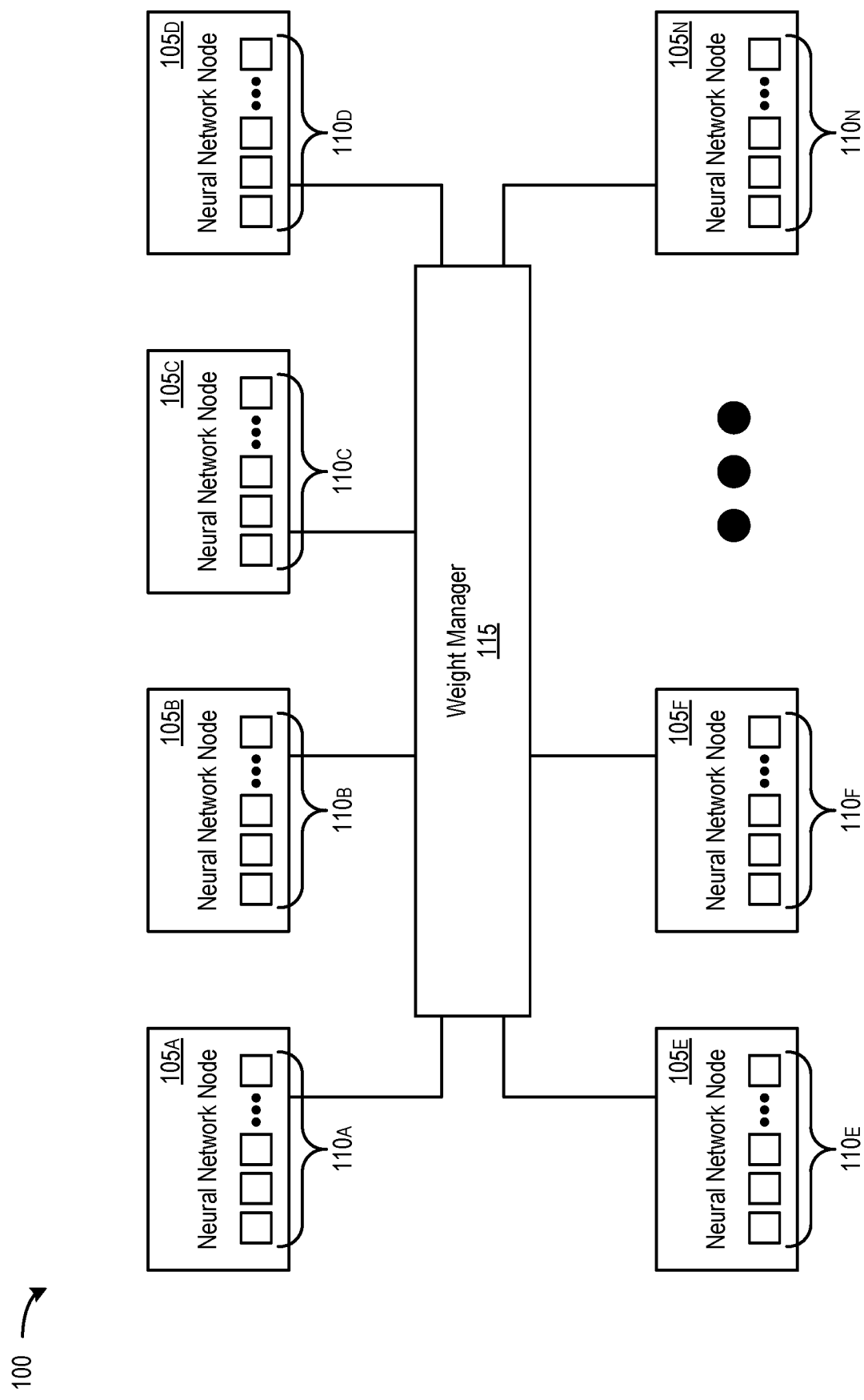
FIG. 1 illustrates a distributed neural network system according to some embodiments.

FIG. 1 illustrates a distributed neural network system 100 according to some embodiments. As shown, distributed neural network system 100 includes neural network nodes 105*a-n* and weight manager 115. In some embodiments, each of the neural network nodes 105*a-n* may be implemented by a separate computing device. Similarly, weight manager 115 can be implemented by a separate computing device.

In some embodiments, each of the neural network nodes 105*a-n* includes a neural network. The neural network of a neural network node 105 includes a set of weights 110 (e.g., a matrix of weight values for the set of weights 110). In some embodiments, the neural network of each neural network node 105 is the same (e.g., they have the same number of layers with the same number of weights in each layer arranged in the same manner). Training data can be used to train the neural network of a neural network node 105. During training of a neural network, values of the set of weights 110 are adjusted based on feedback provided to the neural network (e.g., using a backpropagation technique).

At defined instances (e.g., after training the neural network with a defined amount of training data, after training the neural network for a defined amount of time, etc.), a neural network node 105 may send values of its set of weights 110 to weight manager 115. In some instances, a neural network node 105 receives weight values from weight manager 115. Upon receiving the weight values, the neural network node 105 updates its set of weights 110 with the weight values. Next, the neural network node 105 can continue training its neural network using training data. As mentioned above, training the neural network of a neural network node 105 adjusts the values of its set of weights 110 based on feedback provided to the neural network.

Weight manager 115 is configured to manage weight values of neural network nodes 105*a-n*. For example, weight manager 115 may receive values of a set of weights 110 from a neural network node 105. Upon receiving the weight values from the neural network node 105, weight manager 115 can calculate a set of average weight values based on the most recent weight values received from neural network nodes 105*a-n*. In some embodiments, the weight values that weight manager 115 receives from a neural network node 105 is in the form of a matrix of weight values for its set of weights 110. In some such embodiments, weight manager 115 calculates a set of average weight values by adding the corresponding elements in the matrices of weight values together and dividing each sum of elements by the number of matrices to produce a matrix of average values for the corresponding elements. Weight manager 115 may send the matrix of average values to each of the neural network nodes 105*a-n*. In some embodiments, instead of calculating a set of average weight values and sending them to neural network nodes 105 *a-n* each time weight manager 115 receives weight values from a neural network node 105, weight manager 115 may perform these operations at define intervals (e.g., once every 15 minutes, once an hour, once every five hours, once a day, etc.).

The mechanism described above where weight manager 115 receives weight values from neural network nodes 105a-n, calculates a set of average weight values, and sends the set of average weight values to each of the neural network nodes 105a-n provides a way for neural network nodes 105a-n to share their weight values with one another. After repeated training of the neural networks of the neural network nodes 105a-n and updating of their sets of weights 110a-n with average weight values received from weight manager 115, the values of each of the set of weights 110 will converge to the same values (or very similar). At this point, the neural networks of neural network nodes 105a-n are configured to operate in the same manner. This allows distributed neural network system 100 to provide a parallel processing capability in which multiple instances of the same neural network can be utilized at the same time.

Figure 2:
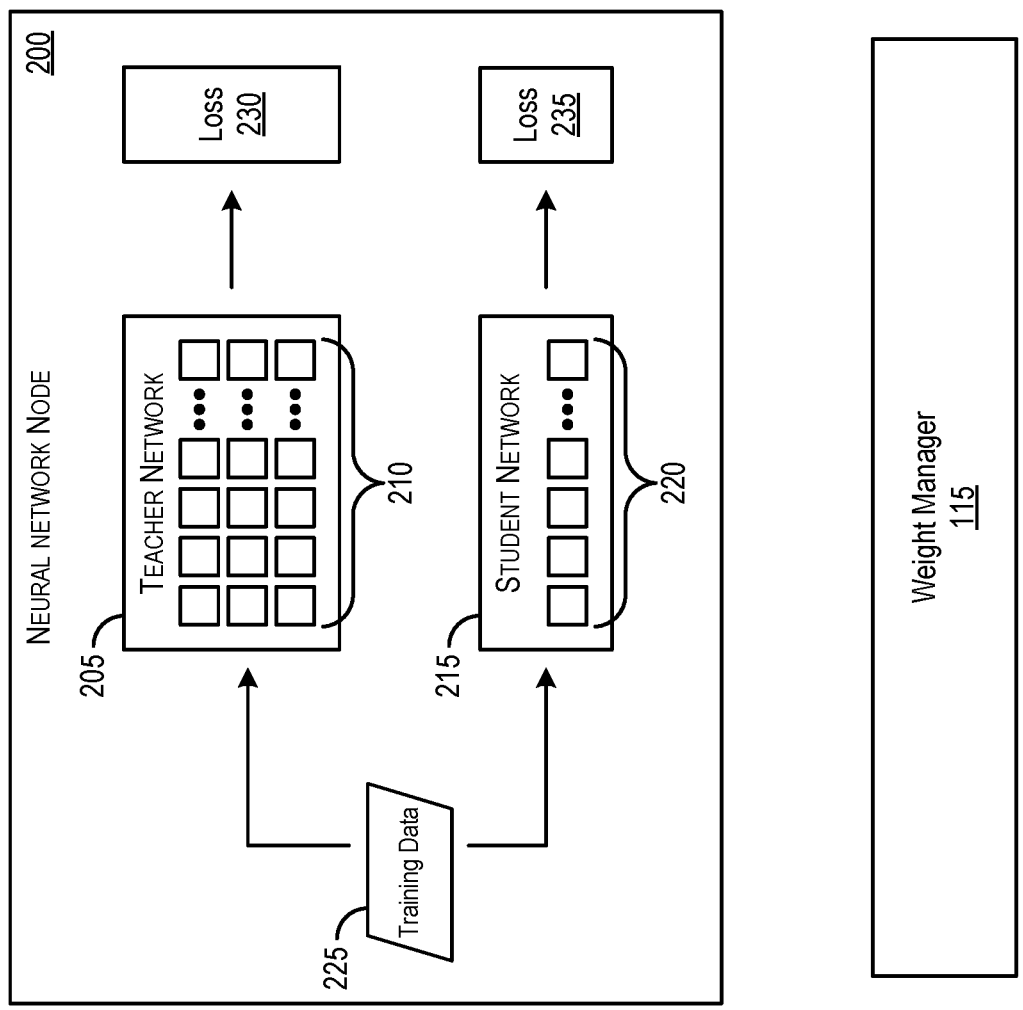
FIGS. 2-6 illustrate an example operation of a neural network node according to some embodiments.

FIGS. 2-6 illustrate an example operation of a neural network node 200 according to some embodiments. In some embodiments, neural network node 200 can be used to implement each of the neural network nodes 105a-n. As shown in FIG. 2, neural network node 200 includes teacher network 200 and student network 215. Teacher network 200 includes a set of weights 210 and student network 215 includes a set of weights 220. In some embodiments, the number of weights in the set of weights 210 is greater than the number of weights in student network 215. In this example, teacher network 205 and student network 215 are configured to be trained together (also referred to as co-training). That is, teacher network 205 and student network 215 use the same training data to train their respective networks. In addition, teacher network 205 and student network 215 are trained to mimic each other. That is, once teacher network 205 and student network 215 are trained, for a given input, teacher network 205 produces a particular output. For the same given input, student network 215 produces the same particular output.

As shown in FIG. 2, training data 225 (e.g., an input matrix) is being used to train both teacher network 205 and student network 215. Specifically, training data 225 is input into teacher network 205 and processed based on the values of its set of weights 210 to produce an output (e.g., an output matrix). Teacher network 205 uses the output to generate loss 230. In some embodiments, teacher network 205 generates loss 230 using a backpropagation technique based on the output of teacher network 205. Student network 215 operates in a similar fashion. In particular, training data 225 is input into student network 215 and processed based on the values of its set of weights 220 to produce an output (e.g., an output matrix). Student network 215 uses the output to generate loss 235. In some embodiments, student network 215 generates loss 235 using a backpropagation technique based on the output of student network 215.

Figure 3:
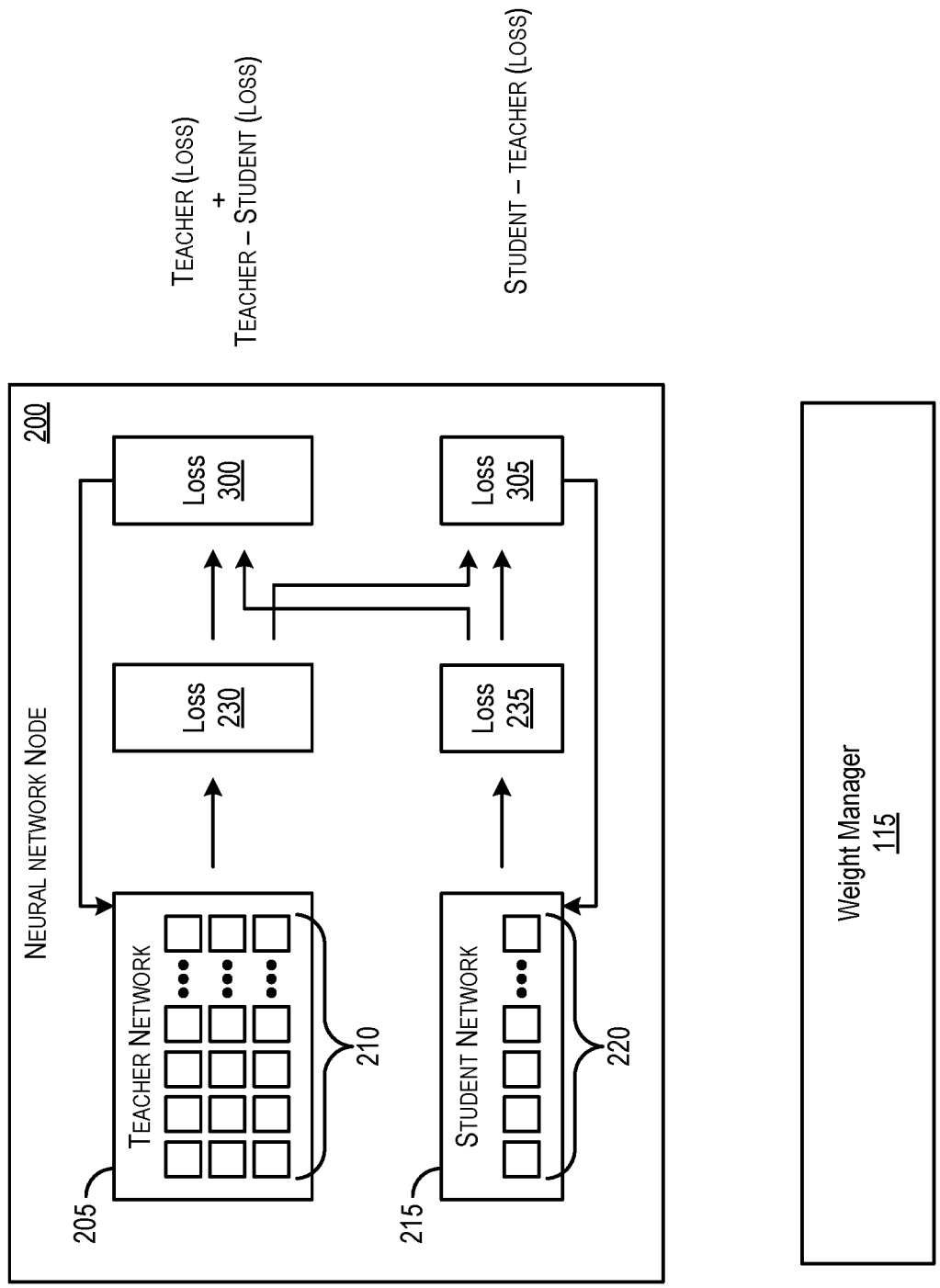

After teacher network 205 and student network 215 process training data 225, they each calculate losses that are used to adjust their respective set of weights 210 and 220. FIG. 3 illustrates how the set of weights 210 and the set of weights 220 are adjusted. Here, teacher network 205 generates loss 300 based on losses 230 and 235. In some embodiments, teacher network 205 generates loss 300 by subtracting loss 235 from loss 230 (i.e., loss 230−loss 235) and adding this difference to loss 230. Next, teacher network 205 adjusts the values of the set of weights 210 using loss 300 via a gradient technique (e.g., a gradient descent technique, a stochastic gradient descent technique, etc.). As shown in FIG. 3, student network 215 generates loss 305 based on losses 230 and 235. In some embodiments, student network 215 generates loss 305 by subtracting loss 230 from loss 235 (i.e., loss 235−loss 230). Student network 215 then adjusts the values of the set of weights 220 using loss 305 via a gradient technique (e.g., a gradient descent technique, a stochastic gradient descent technique, etc.).

Figure 4:
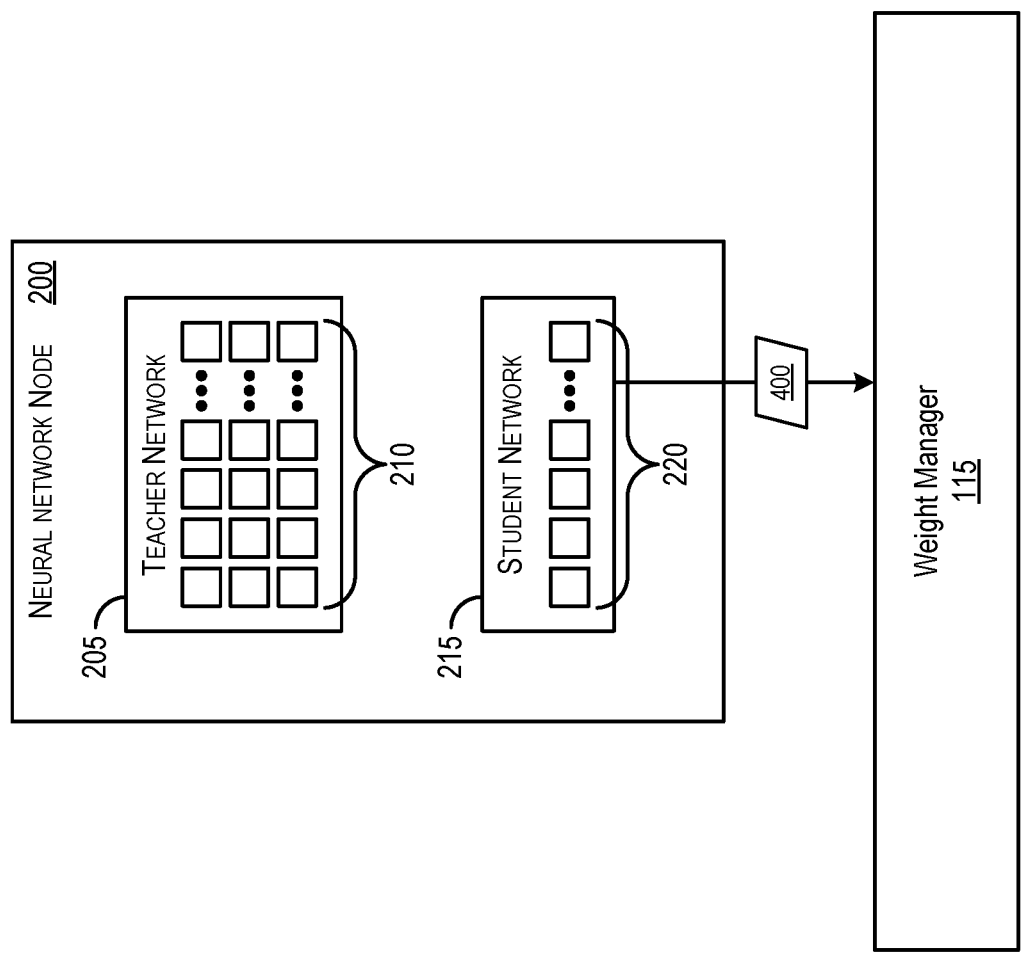
Figure 5:
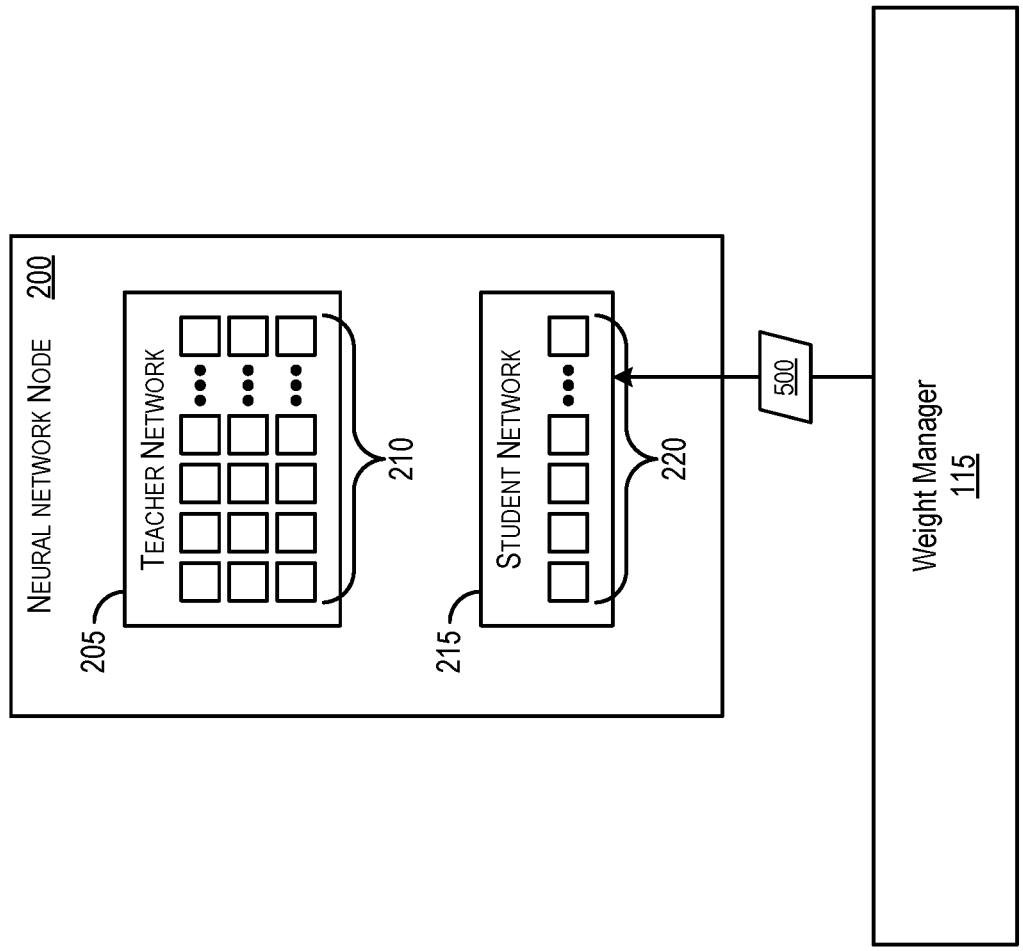

Once student network 215 updates the values of the set of weights 220, student network 215 shares its weight values with weight manager 115. FIG. 4 illustrates the sharing of weight values. As shown, student network 215 sends the values 400 of the set of weights 220 to weight manager 115. At a later time, neural network node 200 can receive weight values from weight manager 115. As explained above, weight manager 115 may calculate a set of average weight values based on the weight values received from neural network nodes 105a-n. For this example, weight manager 115 may calculate a set of average weight values in the same manner described above based on weigh values received from other neural network nodes (not shown) connected to weight manager 115. FIG. 5 illustrates neural network node 200 receiving updates weight values. In particular, student network 215 receives a set of average weight values 500 from weight manager 115. Upon receiving the set of average weight values 500, student network 215 updates the values of the set of weights 220 with the set of average weight values 500.

Figure 6:
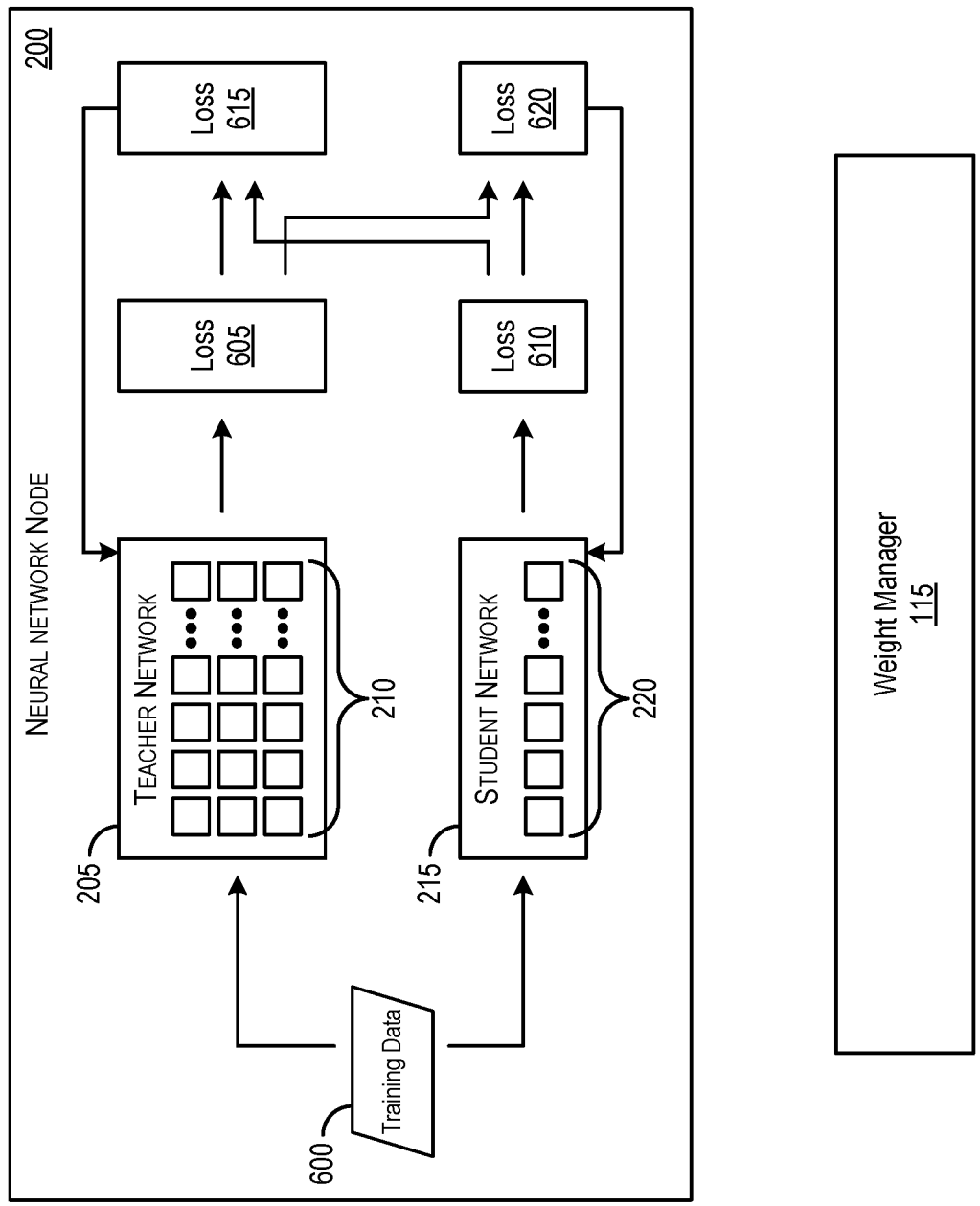

After the values of the set of weights 220 of student network 215 are updated, teacher network 205 and student network 215 can continue to co-train. FIG. 6 illustrates co-training of teacher network 205 and student network 215. As shown, training data 600 (e.g., an input matrix) is input into teacher network 205 and processed based on the values of its set of weights 210 to produce an output (e.g., an output matrix). Teacher network 205 uses the output to generate loss 605 in the same way as that used to generate loss 230. In some embodiments, teacher network 205 generates loss 605 using a backpropagation technique based on the output of teacher network 205. FIG. 6 also shows the updating of the set of weights 210 of teacher network 205. Specifically, teacher network 205 generates loss 615 based on losses 605 and 610. In some embodiments, teacher network 205 generates loss 615 by subtracting loss 610 from loss 605 (i.e., loss 605−loss 610) and adding this difference to loss 605. Teacher network 205 then adjusts the values of the set of weights 210 using loss 615 via a gradient technique (e.g., a gradient descent technique, a stochastic gradient descent technique, etc.).

Student network 215 is trained in a similar manner. As illustrated in FIG. 6, student network 215 receives training data 600 and processes it based on the values of its set of weights 220 to produce an output (e.g., an output matrix). Next, student network 215 uses the output to generate loss 610. In some embodiments, student network 215 generates loss 610 using a backpropagation technique based on the output of student network 215. Student network 215 then generates loss 620 based on losses 605 and 610. In some embodiments, student network 215 generates loss 620 by subtracting loss 605 from loss 610 (i.e., loss 610−loss 605). Student network 215 adjusts the values of the set of weights 220 using loss 620 via a gradient technique (e.g., a gradient descent technique, a stochastic gradient descent technique, etc.).

FIG. 6 illustrates teacher network 205 and student network 215 being co-trained after the values of the set of weights 220 were updated with the set of values 500. When additional training data is used to continue co-training teacher network 205 and student network 215 in the same method shown in illustrated in FIG. 6, the update to the values of the set of weights 220 with the set of values 500 can be propagated to the set of weights 210.

Figure 7:
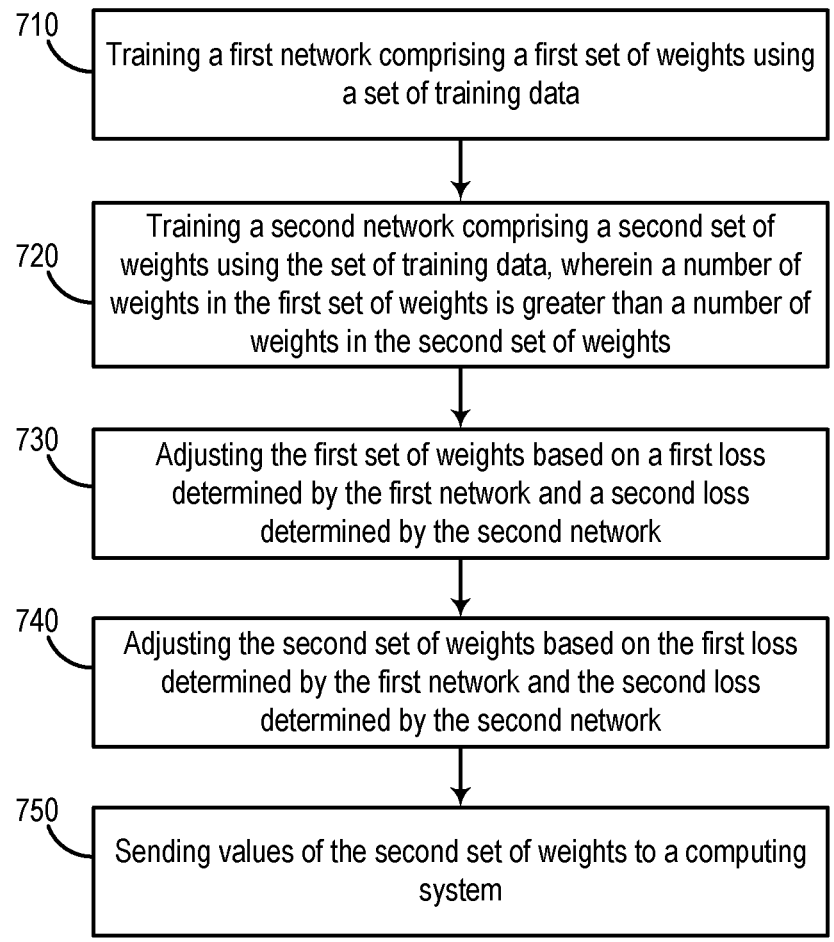
FIG. 7 illustrates a process for compressing weights for distributed neural networks according to some embodiments.

FIG. 7 illustrates a process 700 for compressing weights for distributed neural networks according to some embodiments. In some embodiments, a neural network node (e.g., a neural network node 105 or neural network node 200) may perform process 700. Process 700 begins by training, at 710, a first network comprising a first set of weights using a set of training data. Referring to FIG. 2 as an example, teacher network 205, which includes the set of weights 210, can be trained using training data 225.

Next, process 700, trains, at 720, a second network comprising a second set of weights using the set of training data. A number of weights in the first set of weights is greater than a number of weights in the second set of weights. Referring to FIG. 2 as an example, student network 215, which includes the set of weights 220, may be trained using training data 225. As described above, the number of weights in the set of weights 210 can be greater than the number of weights in the set of weights 220.

Process 700 then adjusts, at 730, the first set of weights based on a first loss determined by the first network and a second loss determined by the second network. Referring to FIG. 3 as an example, the set of weights 210 may be adjusted using loss 300. Loss 300 can be calculated based on loss 230 and loss 235. For example, as mentioned above, teacher network 205 can generate loss 300 by subtracting loss 235 from loss 230 and adding this difference to loss 230.

At 740, process 700 adjusts the second set of weights based on the first loss determined by the first network and the second loss determined by the second network. Referring to FIG. 3 as an example, the set of weights 220 can be adjusted using loss 305. Loss 305 may be calculated based on loss 230 and loss 235. For instance, student network 215 may generate loss 305 by subtracting loss 230 from loss 235.

Finally, process 700 sends values of the second set of weights to a computing system. Referring to FIG. 4 as an example, student network 215 can send the values 400 of the set of weights 220 to weight manager 115. In some embodiments, student network 215 sends the values 400 to weight manager 115 after student network 215 updates the values of the set of weights 220 based on loss 305.

Figure 8:
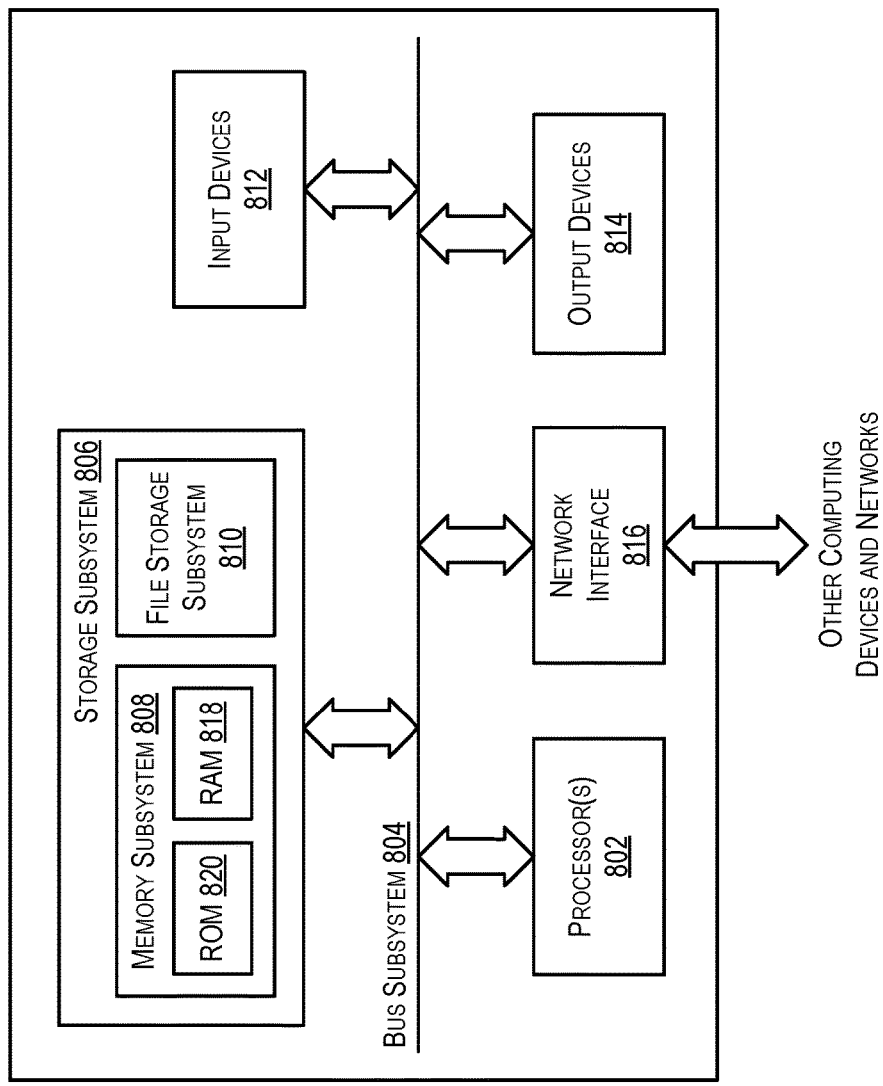
FIG. 8 depicts a simplified block diagram of an example computer system according to some embodiments.

The techniques describe above may be implemented in a wide range of computer systems configured to process neural networks. FIG. 8 depicts a simplified block diagram of an example computer system 800, which can be used to implement the techniques described in the foregoing disclosure. In some embodiments, computer system 800 may be used to implement system 100. As shown in FIG. 8, computer system 800 includes one or more processors 802 that communicate with a number of peripheral devices via a bus subsystem 804. These peripheral devices may include a storage subsystem 806 (e.g., comprising a memory subsystem 808 and a file storage subsystem 810) and a network interface subsystem 816. Some computer systems may further include user interface input devices 812 and/or user interface output devices 814.

Bus subsystem 804 can provide a mechanism for letting the various components and subsystems of computer system 800 communicate with each other as intended. Although bus subsystem 804 is shown schematically as a single bus, alternative embodiments of the bus subsystem can utilize multiple busses.

Network interface subsystem 816 can serve as an interface for communicating data between computer system 800 and other computer systems or networks. Embodiments of network interface subsystem 816 can include, e.g., Ethernet, a Wi-Fi and/or cellular adapter, a modem (telephone, satellite, cable, ISDN, etc.), digital subscriber line (DSL) units, and/or the like.

Storage subsystem 806 includes a memory subsystem 808 and a file/disk storage subsystem 810. Subsystems 808 and 810 as well as other memories described herein are examples of non-transitory computer-readable storage media that can store executable program code and/or data that provide the functionality of embodiments of the present disclosure.

Memory subsystem 808 includes a number of memories including a main random access memory (RAM) 818 for storage of instructions and data during program execution and a read-only memory (ROM) 820 in which fixed instructions are stored. File storage subsystem 810 can provide persistent (e.g., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 800 is illustrative and many other configurations having more or fewer components than system 800 are possible.

Figure 9:
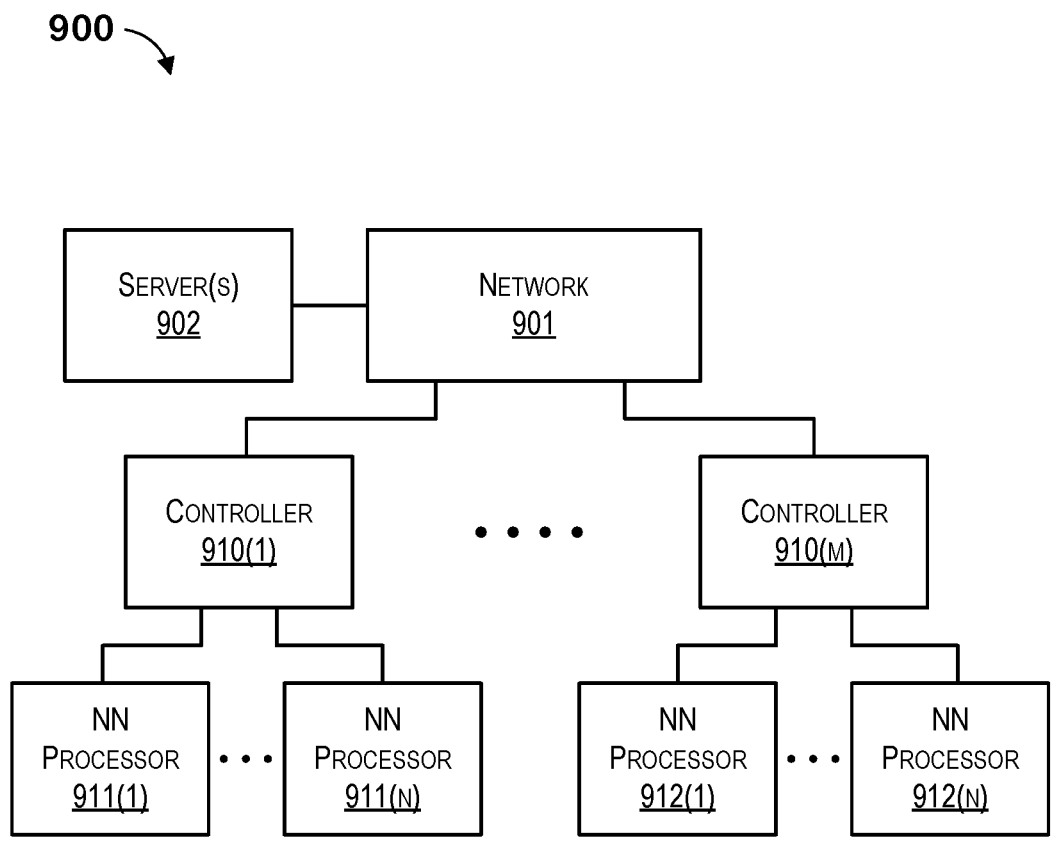
FIG. 9 illustrates a neural network processing system according to some embodiments.

FIG. 9 illustrates a neural network processing system according to some embodiments. In various embodiments, neural networks according to the present disclosure may be implemented and trained in a hardware environment comprising one or more neural network processors. A neural network processor may refer to various graphics processing units (GPU) (e.g., a GPU for processing neural networks produced by Nvidia Corp®), field programmable gate arrays (FPGA) (e.g., FPGAs for processing neural networks produced by Xilinx®), or a variety of application specific integrated circuits (ASICs) or neural network processors comprising hardware architectures optimized for neural network computations, for example. In this example environment, one or more servers 902, which may comprise architectures illustrated in FIG. 8 above, may be coupled to a plurality of controllers 910(1)-910(M) over a communication network 901 (e.g. switches, routers, etc.). Controllers 910(1)-910(M) may also comprise architectures illustrated in FIG. 8 above. Each controller 910(1)-910(M) may be coupled to one or more NN processors, such as processors 911(1)-911(N) and 912(1)-912(N), for example. NN processors 911(1)-911(N) and 912(1)-912(N) may include a variety of configurations of functional processing blocks and memory optimized for neural network processing, such as training or inference. The NN processors are optimized for neural network computations. Server 902 may configure controllers 910 with NN models as well as input data to the models, which may be loaded and executed by NN processors 911(1)-911(N) and 912(1)-912(N) in parallel, for example. Models may include layers and associated weights as described above, for example. NN processors may load the models and apply the inputs to produce output results. NN processors may also implement training algorithms described herein, for example.

Further Example Embodiments

In various embodiments, the present disclosure includes systems, methods, and apparatuses for reducing hardware resource utilization by residual neural networks. The techniques described herein may be embodied in non-transitory machine-readable medium storing a program executable by a computer system, the program comprising sets of instructions for performing the techniques described herein. In some embodiments, a system includes a set of processing units and a non-transitory machine-readable medium storing instructions that when executed by at least one processing unit in the set of processing units cause the at least one processing unit to perform the techniques described above. In some embodiments, the non-transitory machine-readable medium may be memory, for example, which may be coupled to one or more controllers or one or more artificial intelligence processors, for example.

The following techniques may be embodied alone or in different combinations and may further be embodied with other techniques described herein.

For example, in one embodiment, the present disclosure includes a system comprising a set of processing units and a non-transitory machine-readable medium storing instructions that when executed by at least one processing unit in the set of processing units cause the at least one processing unit to train a first network comprising a first set of weights using a set of training data; train a second network comprising a second set of weights using the set of training data, wherein a number of weights in the first set of weights is greater than a number of weights in the second set of weights; adjust the first set of weights based on a first loss determined by the first network and a second loss determined by the second network; adjust the second set of weights based on the first loss determined by the first network and the second loss determined by the second network; and send values of the second set of weights to a computing system.

In one embodiment, the present disclosure further receives a set of values from the computing system and uses the set of values as the values of the second set of weights.

In one embodiment, the set of values is a set of average values calculated from the second set of weights of the second network and values of weights that the computing system received from other systems.

In one embodiment, the set of training data is a first set of training data. The present disclosure further trains the first network using the second set of training data; trains the second network using the second set of training data; adjusts the first set of weights based on a third loss determined by the first network and a fourth loss determined by the second network; and adjusts the second set of weights based on the third loss determined by the first network and the fourth loss determined by the second network.

In one embodiment, adjusting the first set of weights comprises subtracting the second loss from the first loss to form a difference; adding the difference to the first loss to form a sum; and adjusting the first set of weights based on the sum.

In one embodiment, adjusting the second set of weights comprises subtracting the first loss from the second loss to form a difference and adjusting the second set of weights based on the difference.

In one embodiment, the present disclosure further generates a first output based on training the first network using the set of training data and generates a second output based on training the second network using the set of training data. The first network determines the first loss based on the set of training data and the first output. The second network determines the second loss based on the set of training data and the second output.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A system comprising:
a set of processing units; and
a non-transitory machine-readable medium storing instructions that when executed by at least one processing unit in the set of processing units cause the at least one processing unit to:
train a first network comprising a first set of weights using a set of training data;
train a second network comprising a second set of weights using the set of training data, wherein a number of weights in the first set of weights is greater than a number of weights in the second set of weights;
adjust the first set of weights based on a first loss determined by the first network and a second loss determined by the second network;
adjust the second set of weights based on the first loss determined by the first network and the second loss determined by the second network; and
send values of the adjusted second set of weights to a computing system.

2. The system of claim 1, wherein the instructions further cause the at least one processing unit to:
receive a set of values from the computing system; and
use the set of values as the values of the second set of weights.

3. The system of claim 2, wherein the set of values is a set of average values calculated from the second set of weights of the second network and values of weights that the computing system received from other systems.

4. The system of claim 2, wherein the set of training data is a first set of training data, wherein the instructions further cause the at least one processing unit to:
train the first network using the second set of training data;
train the second network using the second set of training data;
adjust the first set of weights based on a third loss determined by the first network and a fourth loss determined by the second network; and
adjust the second set of weights based on the third loss determined by the first network and the fourth loss determined by the second network.

5. The system of claim 1, wherein adjusting the first set of weights comprises:
subtracting the second loss from the first loss to form a difference;
adding the difference to the first loss to form a sum; and
adjusting the first set of weights based on the sum.

6. The system of claim 1, wherein adjusting the second set of weights comprises:
subtracting the first loss from the second loss to form a difference; and
adjusting the second set of weights based on the difference.

7. The system of claim 1, wherein the instructions further cause the at least one processing unit to:
generate a first output based on training the first network using the set of training data; and generate a second output based on training the second network using the set of training data, wherein the first network determines the first loss based on the set of training data and the first output, wherein the second network determines the second loss based on the set of training data and the second output.

8. A method comprising:

training a first network comprising a first set of weights using a set of training data;

training a second network comprising a second set of weights using the set of training data, wherein a number of weights in the first set of weights is greater than a number of weights in the second set of weights;

adjusting the first set of weights based on a first loss determined by the first network and a second loss determined by the second network;

adjusting the second set of weights based on the first loss determined by the first network and the second loss determined by the second network; and sending values of the adjusted second set of weights to a computing system.

9. The method of claim 8 further comprising:

receiving a set of values from the computing system; and using the set of values as the values of the second set of weights.

10. The method of claim 9, wherein the set of values is a set of average values calculated from the second set of weights of the second network and values of weights that the computing system received from other systems.

11. The method of claim 9, wherein the set of training data is a first set of training data, the method further comprising:

training the first network using the second set of training data;

training the second network using the second set of training data;

adjusting the first set of weights based on a third loss determined by the first network and a fourth loss determined by the second network; and adjusting the second set of weights based on the third loss determined by the first network and the fourth loss determined by the second network.

12. The method of claim 8, wherein adjusting the first set of weights comprises:

subtracting the second loss from the first loss to form a difference;

adding the difference to the first loss to form a sum; and adjusting the first set of weights based on the sum.

13. The method of claim 8, wherein adjusting the second set of weights comprises:

subtracting the first loss from the second loss to form a difference; and adjusting the second set of weights based on the difference.

14. The method of claim 8 further comprising:

generating a first output based on training the first network using the set of training data; and generating a second output based on training the second network using the set of training data, wherein the first network determines the first loss based on the set of training data and the first output, wherein the second network determines the second loss based on the set of training data and the second output.

15. A non-transitory machine-readable medium storing a program executable by at least one processing unit of a computer system, the program comprising sets of instructions for:

training a first network comprising a first set of weights using a set of training data;

training a second network comprising a second set of weights using the set of training data, wherein a number of weights in the first set of weights is greater than a number of weights in the second set of weights;

adjusting the first set of weights based on a first loss determined by the first network and a second loss determined by the second network;

adjusting the second set of weights based on the first loss determined by the first network and the second loss determined by the second network; and sending values of the adjusted second set of weights to a computing system.

16. The non-transitory machine-readable medium of claim 15, wherein the program further comprises sets of instructions for:

receiving a set of values from the computing system; and using the set of values as the values of the second set of weights.

17. The non-transitory machine-readable medium of claim 16, wherein the set of values is a set of average values calculated from the second set of weights of the second network and values of weights that the computing system received from other systems.

18. The non-transitory machine-readable medium of claim 16, wherein the set of training data is a first set of training data, wherein the program further comprises sets of instructions for:

training the first network using the second set of training data;

training the second network using the second set of training data;

adjusting the first set of weights based on a third loss determined by the first network and a fourth loss determined by the second network; and adjusting the second set of weights based on the third loss determined by the first network and the fourth loss determined by the second network.

19. The non-transitory machine-readable medium of claim 15, wherein adjusting the first set of weights comprises:

subtracting the second loss from the first loss to form a difference;

adding the difference to the first loss to form a sum; and adjusting the first set of weights based on the sum.

20. The non-transitory machine-readable medium of claim 15, wherein adjusting the second set of weights comprises:

subtracting the first loss from the second loss to form a difference; and adjusting the second set of weights based on the difference.

* * * * *